US012572505B2

(12) United States Patent
Liu et al.

(10) Patent No.: US 12,572,505 B2
(45) Date of Patent: Mar. 10, 2026

(54) DATA QUERY METHOD AND APPARATUS, DEVICE, AND STORAGE MEDIUM

(71) Applicant: HUAWEI TECHNOLOGIES CO., LTD., Shenzhen (CN)

(72) Inventors: Yu Liu, Dongguan (CN); Zheng Li, Dongguan (CN); Dan Luo, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 76 days.

(21) Appl. No.: 18/301,609

(22) Filed: Apr. 17, 2023

(65) Prior Publication Data

US 2023/0259490 A1 Aug. 17, 2023

Related U.S. Application Data

(63) Continuation of application No. PCT/CN2021/124250, filed on Oct. 16, 2021.

(30) Foreign Application Priority Data

| | | |
|---|---|---|
| Oct. 19, 2020 | (CN) | 202011118445.1 |
| Dec. 31, 2020 | (CN) | 202011638412.X |

(51) Int. Cl.
*G06F 16/14* (2019.01)
*G06F 16/13* (2019.01)

(52) U.S. Cl.
CPC ............ *G06F 16/148* (2019.01); *G06F 16/13* (2019.01)

(58) Field of Classification Search
CPC .............................. G06F 16/148; G06F 16/13

USPC .......................................................... 707/741
See application file for complete search history.

(56) References Cited

U.S. PATENT DOCUMENTS

| | | | |
|---|---|---|---|
| 7,890,482 B2 * | 2/2011 | Cornwell | G06F 16/2343 707/704 |
| 10,552,443 B1 * | 2/2020 | Wu | G06F 16/2228 |
| 2007/0283078 A1 * | 12/2007 | Li | G06F 12/0866 711/E12.019 |
| 2013/0166531 A1 * | 6/2013 | Valentin | G06F 16/2423 707/E17.017 |

(Continued)

FOREIGN PATENT DOCUMENTS

| | | |
|---|---|---|
| CN | 102289482 A | 12/2011 |
| CN | 105589951 A | 5/2016 |

(Continued)

OTHER PUBLICATIONS

Extended European Search Report in European Appln No. 21881937. 3, dated Jan. 9, 2024, 8 pages.

*Primary Examiner* — Kimberly L Wilson
(74) *Attorney, Agent, or Firm* — Fish & Richardson P.C.

(57) ABSTRACT

Example data query methods, apparatuses, and computer-readable medium are provided. After receiving a data query request, a data processing system queries target data required by a user from second files with a smaller data amount instead of a first file with a larger data amount. The second files are specifically generated based on the first file. Both the first file and the second file may be files formed by aggregated data or files formed by original data that is not aggregated. Alternatively, the first file is a file formed by original data, and the second file is a file formed by aggregated data. When data is queried, the second file with the smaller data amount is traversed.

20 Claims, 12 Drawing Sheets

(56)                    References Cited

U.S. PATENT DOCUMENTS

2015/0278334  A1*  10/2015  Gerweck ............... G06F 16/283
                                                                              707/706
2017/0068694  A1*   3/2017  Brodt .................. G06F 16/2264
2017/0228422  A1    8/2017  Zhang et al.
2020/0050949  A1    2/2020  Sundararaman et al.
2022/0215021  A1*   7/2022  Shan ................... G06F 16/2465

FOREIGN PATENT DOCUMENTS

CN          106557498  A     4/2017
CN          107169033  A     9/2017
CN          109299141  A     2/2019
CN          111339078  A     6/2020
CN          111723161  A     9/2020

* cited by examiner

| File number | Country (country) | Browser (browser) | Language (language) | Click |
|---|---|---|---|---|
| 0 | AU | Chrome | En (English) | 50 |
| 1 | AU | Chrome | En | 50 |
| 2 | CA | Chrome | En | 400 |
| 3 | CA | Firefox | Fr (French) | 200 |
| 4 | MX | Safari | Es (Spanish) | 300 |
| 5 | MX | Safari | En | 100 |
| 6 | USA | Chrome | En | 600 |
| 7 | USA | Firefox | Es | 200 |
| 8 | USA | Firefox | En | 400 |

FIG. 2

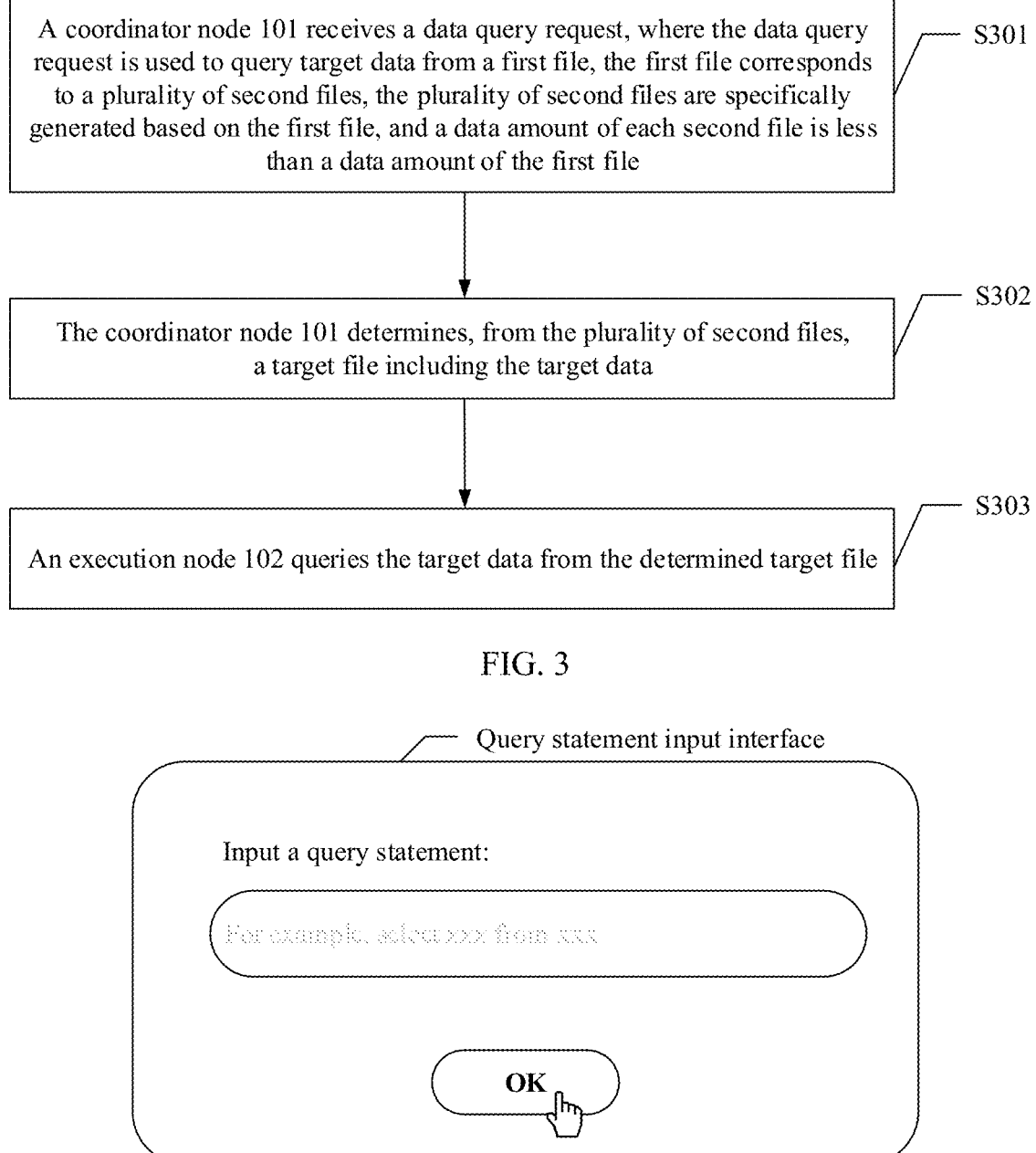

A coordinator node 101 receives a data query request, where the data query request is used to query target data from a first file, the first file corresponds to a plurality of second files, the plurality of second files are specifically generated based on the first file, and a data amount of each second file is less than a data amount of the first file — S301

The coordinator node 101 determines, from the plurality of second files, a target file including the target data — S302

An execution node 102 queries the target data from the determined target file — S303

FIG. 3

Query statement input interface

Input a query statement:

For example, select xxx from xxx

| File number | Country | Browser | Language | Click |
|---|---|---|---|---|
| 0 | AU | Chrome | En (English) | 100 |
| 1 | CA | Chrome | En | 400 |
| 2 | CA | Firefox | Fr (French) | 200 |
| 3 | MX | Safari | Es (Spanish) | 300 |
| 4 | MX | Safari | En | 100 |
| 5 | USA | Chrome | En | 600 |
| 6 | USA | Firefox | Es | 200 |
| 7 | USA | Firefox | En | 400 |

FIG. 5

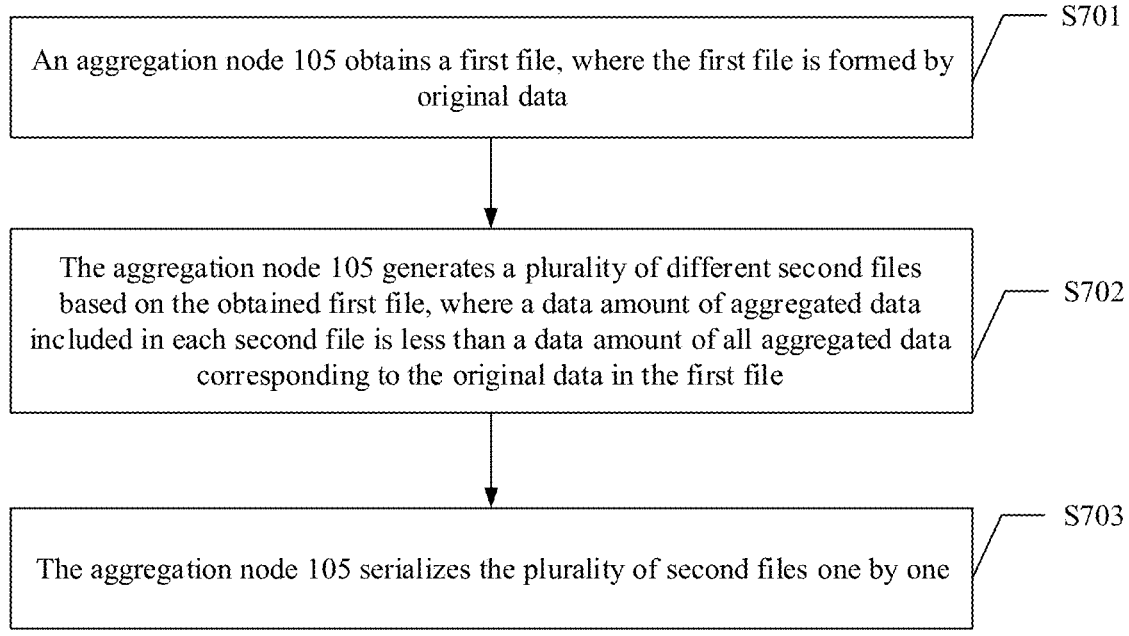

An aggregation node 105 obtains a first file, where the first file is formed by original data — S701

The aggregation node 105 generates a plurality of different second files based on the obtained first file, where a data amount of aggregated data included in each second file is less than a data amount of all aggregated data corresponding to the original data in the first file — S702

The aggregation node 105 serializes the plurality of second files one by one — S703

FIG. 7

(Browser, language, and click)

| File number | Browser | Language | Click (sum) |
|---|---|---|---|
| 0 | Chrome | En | 1100 |
| 1 | Firefox | En | 400 |
| 2 | Firefox | Es | 200 |
| 3 | Firefox | Fr | 200 |
| 4 | Safari | En | 100 |
| 5 | Safari | Es | 300 |

(Browser and click)

| File number | Browser | Click (sum) |
|---|---|---|
| 0 | Chrome | 1100 |
| 1 | Firefox | 800 |
| 2 | Safari | 300 |

(Country, language, and click)

| File number | Country | Language | Click (sum) |
|---|---|---|---|
| 0 | AU | En | 100 |
| 1 | CA | En | 400 |
| 2 | CA | Fr | 200 |
| 3 | MX | Es | 300 |
| 4 | MX | En | 100 |
| 5 | USA | En | 1000 |
| 6 | USA | Es | 200 |

(Language and click)

| File number | Language | Click (sum) |
|---|---|---|
| 0 | En | 1600 |
| 1 | Es | 500 |
| 2 | Fr | 200 |

(Country, browser, and click)

| File number | Country | Browser | Click (sum) |
|---|---|---|---|
| 0 | AU | Chrome | 100 |
| 1 | CA | Chrome | 400 |
| 2 | CA | Firefox | 200 |
| 3 | MX | Safari | 400 |
| 4 | USA | Chrome | 600 |
| 5 | USA | Firefox | 600 |

(Country and click)

| File number | Country | Click (sum) |
|---|---|---|
| 0 | AU | 100 |
| 1 | CA | 600 |
| 2 | MX | 400 |
| 3 | USA | 1200 |

FIG. 8

DATA QUERY METHOD AND APPARATUS, DEVICE, AND STORAGE MEDIUM

CROSS-REFERENCE TO RELATED APPLICATION

This application is a continuation of International Application No. PCT/CN2021/124250, filed on Oct. 16, 2021, which claims priority to Chinese Patent Application No. 202011638412.X, filed on Dec. 31, 2020, and Chinese Patent Application No. 202011118445.1, filed on Oct. 19, 2020. All of the aforementioned applications are hereby incorporated by reference in their entireties.

TECHNICAL FIELD

Embodiments of this application relate to the field of data processing technologies, and in particular, to a data query method and apparatus, a device, and a storage medium.

BACKGROUND

In a big data era, data queried from massive data each time is usually the tip of the iceberg in the massive data, that is, the finally queried data is a small part of the massive data, and a large amount of data needs to be traversed in a query process. Such query manner is usually referred to as "iceberg query". Because a large amount of data needs to be traversed whenever data is queried, and traversal duration is long, query efficiency of "iceberg query" is usually low. Therefore, currently, a data query method that can effectively improve data query efficiency is urgently required.

SUMMARY

Embodiments of this application provide a data query method and apparatus, a device, a storage medium, and a computer program product, to effectively improve data query efficiency.

According to a first aspect, an embodiment of this application provides a data query method. After receiving a data query request, a data processing system may determine, from a plurality of second files, a target file including target data that a user needs to query, and query the target data from the target file. The data query request is used to query the target data from a first file with a larger data amount, the first file corresponds to the plurality of second files, and the plurality of second files are specifically generated based on the first file. Therefore, a data amount of each second file is less than a data amount of the first file. In a process of querying the target data, the second file with a smaller data amount is traversed, instead of the first file with a larger data amount. This can effectively reduce an amount of data that needs to be traversed in the data query process, and effectively improve data query efficiency.

The first file may be a file formed by original data, and the second file may be a file with a smaller data amount generated based on the original data. Alternatively, the first file may be a file generated based on aggregated data obtained after pre-aggregation is performed on original data, and the second file may be a file with a smaller data amount generated based on the aggregated data. Alternatively, the first file is a file formed by original data, and the second file may be a file that is generated after pre-aggregation is performed on the original data and that includes aggregated data. A data amount of aggregated data included in each second file is less than a data amount of aggregated data corresponding to all original data. In this embodiment, specific implementations of the first file and the second file are not limited.

In a possible implementation, the first file includes a plurality of attributes, and the second file includes at least one of the plurality of attributes. When the data processing system determines, from the plurality of second files, the target file including the target data, the data processing system may specifically determine, from the plurality of second files based on a target attribute in the data query request, a second file including the target attribute as the target file. In this way, the second file having the target attribute can be quickly located based on the target attribute of the to-be-queried target data, and the target data required by the user can be found from the second file.

In a possible implementation, when the target data is queried in the target file, the data processing system may specifically replace a first file in a plan tree generated based on the data query request with the determined target file, that is, modify access logic in the plan tree to change access to the first file to access to the target file, to query data from the target file with a smaller data amount.

In a possible implementation, the first file is generated based on the original data, and the data processing system may perform an aggregation operation on the first file based on a preset attribute in the plurality of attributes of the first file, to obtain an aggregated file. Then, when generating a plurality of files, the data processing system may specifically partition the aggregated file based on a value included in the preset attribute (one or more attributes), to divide the aggregated file into a plurality of parts, where each partition includes data corresponding to at least one value. A second file may be separately formed for each partition. In this way, a plurality of second files with a smaller data amount are obtained through division based on the first file, and an amount of data that needs to be traversed in a subsequent data query process can be reduced.

In a possible implementation, each aggregated file not only includes aggregated data, but also may include the corresponding original data used to generate the aggregated data.

In a possible implementation, when partitioning the aggregated file based on the value included in the preset attribute, the data processing system may specifically partition, in a memory, the aggregated file based on the value included in the preset attribute, so that when forming the second file, the data processing system may specifically serialize data in a partition to form a second file, persistently store the second file, and serialize data in a next partition. In this way, a plurality of second files in the memory may be serialized one by one. In addition, a limited physical memory of the data processing system usually more easily supports serialization of aggregated data with a smaller data amount each time. This avoids a failure in a serialization process of partitioned data due to insufficient physical memory space of the data processing system as much as possible.

In a possible implementation, the data processing system may generate the second file by combining attributes. Specifically, for each second file, the data processing system may obtain M attributes from N attributes of the first file, and form the second file based on data corresponding to the M attributes, to obtain second files with a same value of M and second files with different values of M. In addition, attributes included in the second files with the same value of M are not totally the same. In this way, different second files obtained by combining the attributes correspond to different attribute combinations.

In a possible implementation, when the data processing system obtains the M attributes from the N attributes of the first file, and forms the second file by the data corresponding to the M attributes, the data processing system may specifically read the first file into a memory and obtain the M attributes from the first file, and then perform an aggregation operation on the data corresponding to the M attributes, to serialize data obtained after the aggregation operation, so as to form the second file. In this way, a plurality of second files with a smaller data amount can be generated.

In a possible implementation, when the second file includes the aggregated data, the data processing system may further perform a secondary aggregation operation on the target data found in the target file, and feed back data obtained after the secondary aggregation operation as a query result to the user. This can be convenient for the user to quickly obtain the data that the user needs to query.

In a possible implementation, a data amount of each second file is greater than a specific threshold. A quantity of stored second files can be small, and correspondingly, a quantity of metadata of each second file that needs to be stored is also reduced. This can avoid that data query efficiency is reduced due to excessive metadata of the second file.

According to a second aspect, based on a same inventive concept as the method embodiment of the first aspect, an embodiment of this application provides a data query apparatus. The apparatus has a corresponding function for implementing each implementation of the first aspect. The function may be implemented by hardware, or may be implemented by hardware executing corresponding software. The hardware or the software includes one or more modules corresponding to the function.

According to a third aspect, an embodiment of this application provides a device, including a processor and a memory. The memory is configured to store instructions. When the device runs, the processor executes the instructions stored in the memory, so that the device performs the data query method according to any one of the first aspect or the implementations of the first aspect. It should be noted that the memory may be integrated into the processor, or may be independent of the processor. The device may further include a bus. The processor is connected to the memory through the bus. The memory may include a readable memory and a random access memory.

According to a fourth aspect, an embodiment of this application further provides a readable storage medium. The readable storage medium stores a program or instructions, and when the program or the instructions are run on a computer, the data query method according to any one of the first aspect or the implementations of the first aspect is performed.

According to a fifth aspect, an embodiment of this application further provides a computer program product including instructions. When the computer program product runs on a computer, the computer is enabled to perform the data query method according to any one of the first aspect or the implementations of the first aspect.

In addition, for technical effects brought by any implementation of the second aspect to the sixth aspect, refer to the technical effects brought by different implementations of the first aspect, or refer to the technical effects brought by different implementations of the second aspect. Details are not described herein again.

BRIEF DESCRIPTION OF DRAWINGS

To describe the technical solutions in embodiments of this application more clearly, the following briefly describes the accompanying drawings for describing embodiments. It is clear that the accompanying drawings in the following description show merely some embodiments of this application, and an ordinary person skilled in the art may still derive other drawings from these accompanying drawings.

FIG. 2 is a schematic diagram of an example of original data;

FIG. 3 is a schematic flowchart of a data query method according to an embodiment of this application;

FIG. 4 is a schematic diagram of an example of a query statement input interface according to an embodiment of this application;

FIG. 5 is a schematic diagram of aggregated data obtained after the original data shown in FIG. 2 is aggregated;

FIG. 7 is a schematic flowchart of a method for generating a second file according to an embodiment of this application;

FIG. 8 is a schematic diagram of generating a plurality of second files based on a first file;

DESCRIPTION OF EMBODIMENTS

Figure 1:
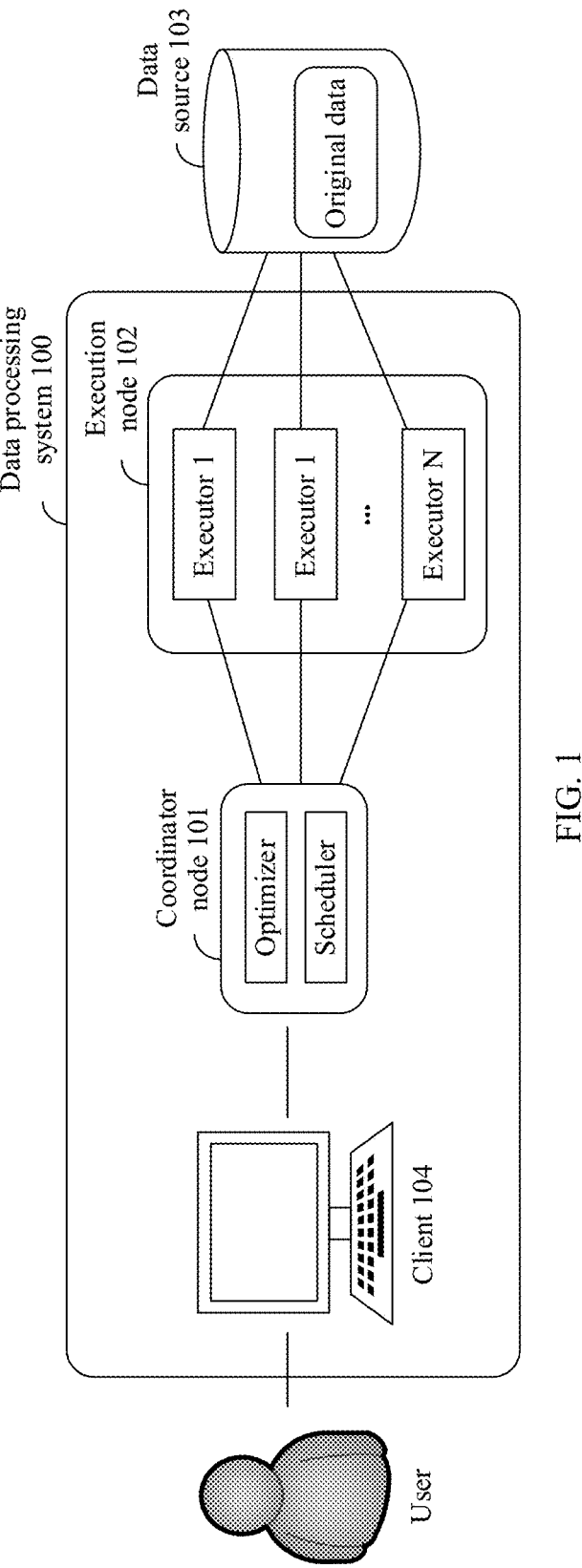
FIG. 1 is a schematic diagram of a structure of an example of a data processing system according to an embodiment of this application.

FIG. 1 is a schematic diagram of a structure of an example of a data processing system. As shown in FIG. 1, a data processing system 100 may include a coordinator node 101 and an execution node 102. The execution node 102 may access original data in a data source 103. The data source 103 may include one or more data sources, such as a Hive data source and an Oracle data source shown in FIG. 1.

The data processing system 100 may provide a client 104 externally, to perform human-machine interaction with a user, so as to execute a corresponding data query process based on a query statement input by the user. For example, as shown in FIG. 2, the original data stored in the data source 103 may be clicks of different browsers used in different countries and languages used by the browsers. The user may input a structured query language (SQL) statement to the client 104: select sum(Impressions) from cube_test where country<'MX' and browser<'firefox' group by browser, to expect to query a sum of clicks (sum(Impressions)) of browsers whose attribute value of a "country" attribute is less than "MX" and attribute value of a "browser" attribute is less than "Firefox". The coordinator node 101 may receive, by using the client 104, the SQL statement input by the user, and perform syntax analysis and semantic analysis on the SQL statement. The syntax analysis means that the coordinator node 101 checks, by using a syntax rule of an SQL language, whether the SQL statement has a syntax error. The semantic analysis means that the coordinator node 101 analyzes whether semantics of the SQL statement are valid. When both syntax and the semantics of the SQL statement are valid, the coordinator node 101 may generate a plan tree based on the SQL statement. The plan tree indicates an execution plan for performing operations such as calculation, analysis, and access on data. Then, the coordinator node 101 may optimize the plan tree by using one or more optimizers, and send an optimized plan tree to the execution node 102 for execution. Specifically, the coordinator node 101 may determine, by using a corresponding scheduler, an executor to which the plan tree is to be sent for execution and that is in the execution node 102. The execution node 102 may include one or more executors (in FIG. 1, an executor 1 to an executor N are used as an example). The execution node 102 may execute a corresponding plan based on the received plan tree: reading, from the data source 103, original data (namely, data in three rows with file numbers of 0, 1, and 2 in FIG. 2) whose attribute value of a "country" attribute is less than "MX" and attribute value of a "browser" attribute is less than "Firefox", and performing a summation calculation on clicks based on the read original data. A calculation result is "500" (that is, 50+50+400). Then the calculation result "500" (that is, a query result this time) is returned to the client 104 by using the coordinator node 101, so that the calculation result "500" is presented to the user on the client 104.

The original data stored in the data source 103 shown in FIG. 2 is merely used as an example. In an actual application, a data amount of the original data stored in the data source 103 is usually large, for example, a quantity of rows of the original data stored in the data source 103 may reach tens of millions or even hundreds of millions. In this case, the execution node 102 needs to traverse excessive original data, so that data query efficiency of the data processing system 100 is reduced.

Based on this, an embodiment of this application provides a data query method, to improve the data query efficiency of the data processing system 100. During specific implementation, the data processing system 100 may determine, from a plurality of files with a smaller data amount based on a received data query request, a target file including to-be-queried target data, and query the target data from the determined target file with a smaller data amount, instead of querying the data from massive data with a larger data amount. Because an amount of data that needs to be traversed is effectively reduced, the data query efficiency of the data processing system 100 can be effectively improved.

To make the objectives, features, and advantages of this application more apparent and understandable, the following describes various non-limiting implementations in embodiments of this application with reference to the accompanying drawings by using examples. It is clear that the described embodiments are some but not all of embodiments of this application. All other embodiments obtained by a person of ordinary skill in the art based on embodiments of this application without creative efforts shall fall within the protection scope of this application.

FIG. 3 is a schematic flowchart of the data query method according to this embodiment of this application. The method may be applied to the data processing system 100 shown in FIG. 1, and may be performed by the data processing system 100 or a corresponding node in the data processing system 100. In this embodiment, descriptions are provided by using an example in which a plurality of nodes in the data processing system 100 collaboratively perform the method. The method may specifically include the following steps.

S301: The coordinator node 101 receives a data query request, where the data query request is used to query target data from a first file, the first file corresponds to a plurality of second files, the plurality of second files are specifically generated based on the first file, and a data amount of each second file is less than a data amount of the first file.

When the original data in the data source 103 that can be accessed by the data processing system 100 is stored, a file with a larger data amount may be formed, and is referred to as a first file below. The target data required by a user may be queried from the first file.

In this embodiment, the data processing system 100 may generate, in advance based on the first file, the plurality of second files with a smaller data amount. The data amount of each second file is less than the data amount of the first file, and different data is included in different second files. The first file and the second file may be used to support a data query task of the data processing system 100. For a specific implementation of how to generate the plurality of different second files based on the first file, refer to related descriptions below. Details are not described herein again.

In an implementation example for receiving a data query request, the data processing system 100 includes the client 104, and the client 104 may present a query statement input interface shown in FIG. 4 to a user. The user may input a corresponding query statement in a specific area on the query statement input interface presented on the client 104, so that the data processing system 100 feeds back a query result expected by the user. For example, for the original data shown in FIG. 2, the user may input an SQL statement on the query statement input interface: select sum(Impressions) from cube_test where country<'MX' and browser<'firefox' group by browser, to expect to query a sum of clicks (sum(Impressions)) of browsers whose attribute value of a "country" attribute is less than "MX" and whose attribute value of a "browser" attribute is less than "Firefox". Then, the client 104 generates the corresponding data query request based on the data query statement, and sends the data query request to the coordinator node 101, to query, based on the data query request, the target data required by the user.

It should be noted that, in this embodiment, descriptions are provided by using an example in which the first file is a file formed by original data. In another embodiment, the first file may also be a file formed by aggregated data obtained after pre-aggregation is performed based on original data. Specific implementations based on the first file and the second file have the following combinations.

The first file may be a file formed by original data, and the second file is a file with a smaller data amount generated based on the original data. For example, the first file may be directly divided into a plurality of second files with a smaller data amount.

Alternatively, the first file may be a file generated based on aggregated data obtained after pre-aggregation is performed on original data, and the second file may be a file with a smaller data amount generated based on the aggregated data. In this case, data in the second file may be aggregated data, and a data amount of the aggregated data included in each second file is less than a data amount of the aggregated data included in the first file.

Alternatively, the first file is a file formed by original data, the second file may be a file that includes aggregated data and that is generated after pre-aggregation is performed on original data, and a data amount of the aggregated data included in each second file is less than a data amount of aggregated data corresponding to all original data. In this embodiment, specific implementations of the first file and the second file are not limited.

For massive original data, the data processing system 100 may calculate, based on an attribute or an attribute set (which includes a plurality of attributes), an aggregate value for data having the attribute, which may be referred to as pre-aggregation. For example, a plurality of pieces of original data having a same attribute may be aggregated into new data (namely, the foregoing aggregated data). For example, aggregated data shown in FIG. 5 and the like may be obtained after an aggregation operation is performed on the original data shown in FIG. 2. The aggregated data has some or all attributes of the original data, and an attribute value of the aggregated data may be an accumulation of attribute values of the plurality of pieces of the original data, or the like. In this way, when querying data, the data processing system 100 may directly find aggregated data (namely, the pre-calculated aggregate value) expected by the user, and may not search for original data and then perform an aggregation operation, to effectively improve data query efficiency.

S302: The coordinator node 101 determines, from the plurality of second files, a target file including the target data.

Usually, the first file includes the target data required by the user. However, because the first file has a large amount of data, if the target data is found by traversing the data in the first file, data query efficiency of the data processing system 100 is reduced due to an excessively large amount of data that needs to be traversed. Therefore, in this embodiment, when querying the target data, the data processing system 100 does not traverse the data from the first file, but traverses, from one or more second files with a smaller data amount, the target data required by the user.

For example, the coordinator node 101 performs semantic and syntax analysis based on the received data query request, and generates a plan tree based on the data query request. In this case, a file to be accessed by the plan tree is the first file. Then, the coordinator node 101 may determine a target attribute of the target data based on the data query request. For example, when a query statement input by a user for the original data shown in FIG. 2 is: select sum (Impressions) from cube_test where country<'MX' group by browser, the coordinator node 101 may determine, based on a data query request generated based on the query statement, that a query condition is: searching for target data whose attribute value of an attribute "country" is less than "MX", and the target attribute of the target data is "country". Then, the coordinator node 101 may determine, from the plurality of second files based on the target attribute and metadata corresponding to each second file (the metadata describes an attribute and/or an attribute value range of the second file), a target file that conforms to the target attribute, for example, may use a second file having the target attribute as the target file. The target file may include one or more second files. Finally, the coordinator node 101 may rewrite execution logic of the plan tree based on the determined target file, that is, replace access logic for the first file in the plan tree with access logic for the target file, and send a modified plan tree to the execution node, so that the execution node queries, based on the plan tree, the data required by the user from a corresponding second file.

In a further possible implementation, the coordinator node 101 may further optimize the modified plan tree by using one or more optimizers, and send an optimized plan tree to the execution node 102, to further improve efficiency of querying the target data by the execution node 102.

S303: The execution node 102 queries the target data from the determined target file.

During specific implementation, the execution node 102 may determine, based on the received plan tree, to access the target file, and traverse data from the determined target file, to find data that meets the query condition, where the data is the target data required by the user.

It should be noted that, in a process of querying the target data, data traversal is performed on the target file (namely, the second file) with a smaller data amount, instead of the first file with a larger data amount. This can effectively reduce an amount of data that needs to be traversed in the data query process, and effectively improve data query efficiency.

Further, the target data accessed by the execution node 102 in the target file may be forwarded to the client 104 by using the coordinator node 101, so that the client 104 may present the found target data to the user.

In some possible implementations, data in the target file is original data. In this case, the execution node 102 may aggregate the original data, and feed back aggregated data obtained through aggregation to the client 104. Therefore, a query result presented by the client 104 to the user is the aggregated data. Alternatively, when data in the target file is aggregated data obtained based on original data, the execution node 102 may further perform a secondary aggregation operation on some or all of the aggregated data (namely, the target data) in the target file, and feed back, as a query result, aggregated data obtained after the secondary aggregation operation to the client 104, so that the client 104 presents the aggregated data to the user.

In the embodiment shown in FIG. 3, the technical solutions in this embodiment of this application are demonstrated from a perspective of processing the data query request by the data processing system. In an actual application, before processing the data query request, the data processing system may further generate a plurality of different second files in advance based on the first file. In addition, data in the second file may be original data, or may be aggregated data generated based on original data. The following describes a specific implementation process of generating the second file in this embodiment of this application by using an example in which data in the first file is original data and the data in the second file is the aggregated data.

Figure 6:
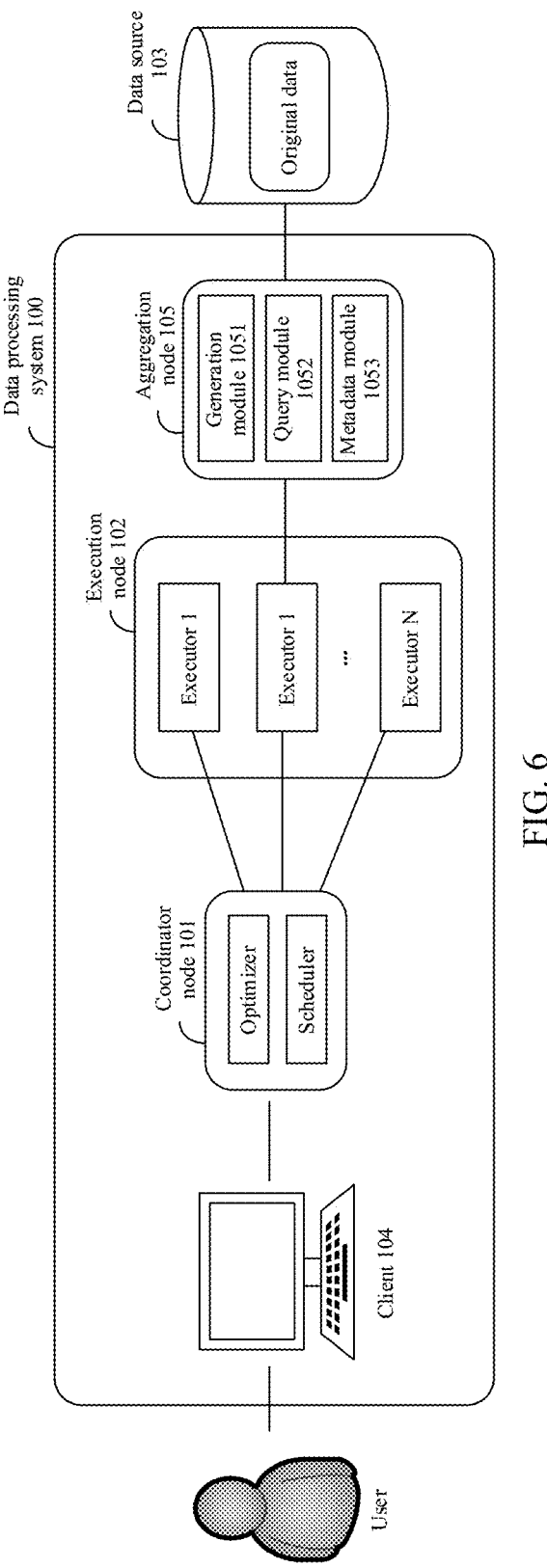
FIG. 6 is a schematic diagram of a structure of another example of a data processing system according to an embodiment of this application.

As shown in FIG. 6, based on the data processing system shown in FIG. 1, an aggregation node 105 may be further added, and the aggregation node 105 performs an aggregation operation on the original data and serializes obtained aggregated data to the data source 103. Serialization refers to converting data from a current format (for example, an object format in the Java language) into a storage format, so that the data can be stored in a storage area. Certainly, in another implementation, the aggregated data may alternatively be serialized to another node in the data processing system 100, or serialized to another location that can be accessed by the aggregation node 105, for example, a local file system or a distributed file system (Hadoop distributed file system, HDFS). For ease of description, the following describes the technical solutions in this embodiment of this application by using an example in which the added aggregation node 105 shown in FIG. 6 performs an aggregated data serialization method and serializes the aggregated data to the data source 103. As shown in FIG. 7, a method procedure for generating the second file may specifically include the following steps.

S701: The aggregation node 105 obtains a first file, where the first file is formed by original data.

The original data is data that needs to be aggregated in this embodiment. When the original data is stored in the data source 103, the first file may be formed, and the aggregation node 105 may obtain, by accessing the data source 103, the first file including the original data.

The aggregation node 105 may be implemented by software. For example, the aggregation node 105 may be used as a function module, and is deployed in a same physical device (for example, a network device such as a server) as the execution node 102. Optionally, to improve an operation capability of the aggregation node 105, a function of the aggregation node 105 may also be implemented by using independent hardware. For example, the aggregation node 105 may be a device such as a server that is configured independently of the execution node 102, or may be implemented by using an application-specific integrated circuit (ASIC) or a programmable logic device (PLD). The PLD may be a complex programmable logic device (CPLD), a field-programmable gate array (FPGA), generic array logic (GAL), or any combination thereof, and may be integrated into a physical device in which the execution node 102 is located.

S702: The aggregation node 105 generates a plurality of different second files based on the obtained first file, where a data amount of aggregated data included in each second file is less than a data amount of all aggregated data corresponding to the original data in the first file.

S703: The aggregation node 105 serializes the plurality of second files one by one.

In this embodiment, the aggregation node 105 may perform an aggregation operation on the original data in the obtained first file, to generate aggregated data corresponding to the original data. In this way, when subsequently querying data, the data processing system 100 may find, from the aggregated data, target data required by a user. Because a data amount of the aggregated data is usually less than a data amount of the original data, query efficiency of finding the target data from the aggregated data by the data processing system 100 may be usually higher than query efficiency of finding the target data from the original data.

Usually, the aggregation node 105 serializes the aggregated data to a persistent storage area (such as a hard disk). A format of the aggregated data is different from a storage format of the aggregated data in the persistent storage area. For example, the aggregated data obtained through calculation usually exists as an object in the Java language, but the aggregated data may be stored in binary data (or converted into another format for storage). Therefore, before storing the aggregated data, the aggregation node 105 usually first performs format conversion on the aggregated data in a memory, and after completing format conversion on all the aggregated data, writes, from the memory to a corresponding storage area, aggregated data obtained after the format conversion.

However, a data amount of aggregated data calculated based on massive original data is usually large. Therefore, when the aggregation node 105 serializes the aggregated data to the persistent storage area, it is possible that formats of all generated aggregated data in a physical memory cannot be totally converted into a storage format due to a limitation of physical memory space of the data processing system 100. To be specific, after some aggregated data is converted, the physical memory of the data processing system 100 is totally occupied, and format conversion of remaining aggregated data cannot be supported. As a result, a serialization process of the aggregated data fails.

Therefore, in this embodiment, the aggregation node 105 may generate the plurality of second files with a smaller data amount based on the first file, so that when serializing the aggregated data, the aggregation node 105 may serialize only the second file with a smaller data amount each time, to improve a serialization success rate of the aggregated data.

In an implementation of generating the second file, the aggregation node 105 may aggregate original data by combining attributes, to generate different second files based on different attribute combinations. Specifically, when generating a second file, the aggregation node 105 may obtain M attributes (M<N, and both M and N are positive integers) from N attributes of the first file, and read the first file into a memory. Then, the aggregation node 105 may perform, in the memory, an aggregation operation on the first file based on the M attributes, to obtain aggregated data corresponding to the M attributes. Then, the aggregation node 105 may serialize the aggregated data corresponding to the M attributes, to form the second file, and store the second file in a persistent storage area such as a hard disk. A plurality of different attribute combination s may be obtained based on the N attributes of the first file, quantities of attributes and/or attribute categories included in different attribute combinations are different, and one second file may be generated for each attribute combination. For example, for the first file shown in FIG. 1, attributes of the first file may include "country", "browser", "language" (language, which belongs to one type of region setting), and "click" (impressions). In this case, attribute combinations obtained by the aggregation node 105 based on the four attributes may include six attribute combinations: (country, browser, and click), (country, language, and click), (browser, language, and click), (country and click), (browser and click), and (language and click). Then, the aggregation node 105 may separately aggregate the first file based on attributes included in each attribute combination, to obtain a plurality of different second files. For example, a plurality of second files shown in FIG. 8 may be obtained based on the foregoing six attribute combinations. For each second file, a data amount of aggregated data of the second file is less than that of all aggregated data obtained after the original data is aggregated by using the four attributes.

Figure 9:
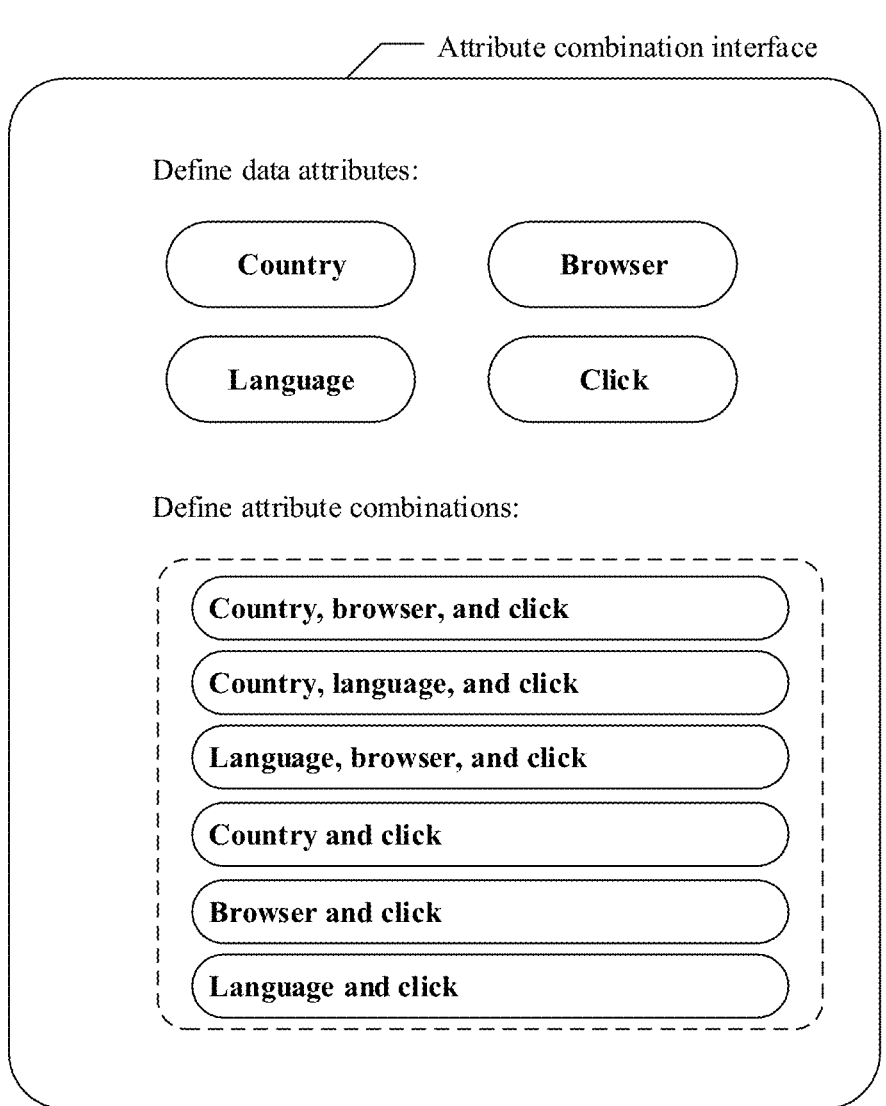
FIG. 9 is a schematic diagram of an attribute combination interface according to an embodiment of this application.

In an example, a combination manner of attributes may be determined by a user in addition to being freely combined by the aggregation node 105 based on different attributes. For example, the data processing system 100 may externally present an attribute combination interface shown in FIG. 9 to the user. The attribute combination interface may be, for example, presented to the user by using the client 104. The user may define, in the attribute combination interface, attributes corresponding to original data, for example, define attributes such as "country", "browser", "language", and "click", and the user inputs a plurality of attribute combinations in the interface based on the defined attributes. In this way, the aggregation node 105 may generate a plurality of corresponding second files based on the plurality of attribute combinations input by the user.

In another example of an implementation of generating the second file, the aggregation node 105 may first generate all aggregated data based on the first file, and all the aggregated data may form an aggregated file. Then, the aggregation node 105 may partition the aggregated file based on a value included in a preset attribute. For example, the aggregated file may be specifically partitioned in a memory, so that one second file may be formed for each partition. In this way, after the first file is partitioned, a plurality of different second files may be formed, attribute values of preset attributes of different second files are different, and aggregated data included in each second file is a subset of all the aggregated data corresponding to the original data. Therefore, a data amount of the aggregated data included in each second file is less than a data amount of all the aggregated data corresponding to the original data. The preset attribute may include one attribute, or may include a plurality of attributes. This is not limited in this embodiment.

Correspondingly, when each second file is serialized, aggregated data in one partition is serialized to form a second file, the second file is persistently stored, and aggregated data in a next partition is serialized. In this way, the plurality of second files may be serialized one by one. In addition, a data amount of the second file serialized each time is small, and a problem that serialization of the second file fails due to insufficient physical space is not likely to occur.

In some implementations, when dividing the aggregated file, the aggregation node 105 may divide the aggregated file according to a preset division rule. The preset division rule may be, for example, any one or more of a lexicographic order of an attribute, an upper limit of a quantity of nodes corresponding to the aggregated data included in the second file in a tree-based index structure, and an upper limit of a difference of attribute values of an attribute.

The lexicographical order of the attribute refers to sorting, in the lexicographical order, an attribute value of an attribute (referred to as a preset attribute below) corresponding to aggregated data. The lexicographic order may also be referred to as an alpha order, that is, attribute values are arranged in alpha order. Correspondingly, dividing the aggregated data based on the lexicographic order of the attributes means sorting attribute values of one (or more) preset attributes based on the lexicographic order, and dividing the aggregated data based on the sorting. The aggregated file shown in FIG. 5 is still used as an example. It is assumed that the preset attribute is "country", the aggregation node 105 may first sort attribute values: "AU", "CA", "MX", and "USA" of the preset attribute according to the lexicographic order, and then divide aggregated data in the aggregated file at intervals of two attribute values, that is, aggregated data (namely, data in three rows with the file numbers of 0 to 2) whose attribute values are "AU" and "CA" is classified into one second file, aggregated data (namely, data in three rows with the file numbers of 3 to 7) whose attribute values are "MX" and "USA" is classified into another second file. Each second file includes only two types of attribute values of the attribute "country", and attribute values of the attribute "country" in different second files are different.

The upper limit of the quantity of the nodes corresponding to the aggregated data included in the second file in the tree-based index structure means that the aggregation node 105 may form the tree-based index structure based on the aggregated data, and the aggregated data may be the nodes in the tree-based index structure, to divide the aggregated data, that is, divide subtrees of the tree-based index structure. A quantity of nodes included in each subtree obtained through division does not exceed the upper limit of the quantity of the nodes. In this way, the tree-based index structure may be divided into a plurality of subtrees, each subtree corresponds to a second file, and a node included in each subtree corresponds to corresponding aggregated data included in the second file.

Figure 10:
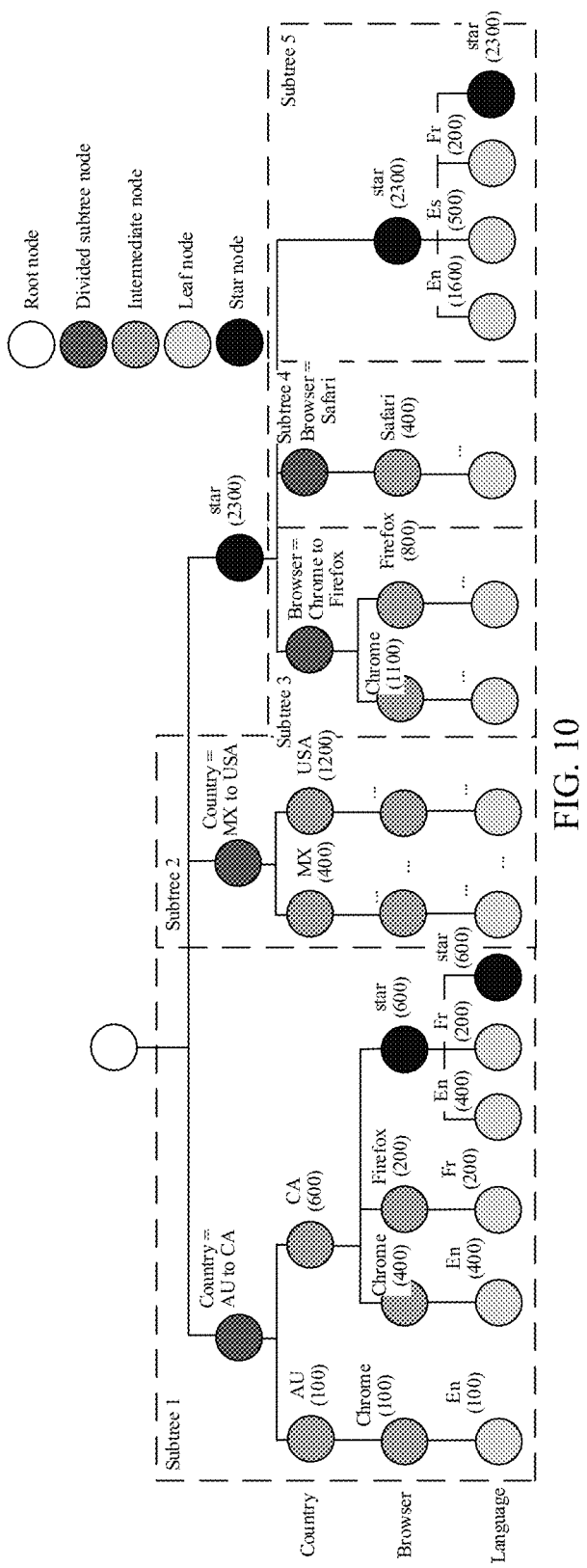
FIG. 10 is a schematic diagram of an example of a tree-based index structure according to an embodiment of this application.

For example, based on the aggregated data shown in FIG. 5, a tree-based index structure shown in FIG. 10 (not all intermediate nodes are displayed) may be generated, and the tree-based index structure shown in FIG. 10 may also be referred to as a star tree. The tree-based index structure shown in FIG. 10 may include a root node, an intermediate node, a leaf node, and a star node.

The root node refers to a topmost node in FIG. 10, and each tree usually has only one root node. The leaf node refers to a node without a subnode (or referred to as a downstream node). Each tree usually includes one or more leaf nodes, and a value of "click" stored in the leaf node is aggregated data. The intermediate node refers to a non-root node, a non-leaf node, and a non-star node in a tree. Each intermediate node has both an upstream node and a downstream node. A value of "click" stored in the intermediate node is a sum of values of "click" of all subnodes of the intermediate node, and belongs to aggregated data. The star node is a node of a specific type. A value of "click" stored in the star node is a sum of values of "click" stored in a plurality of other nodes at a same layer, and belongs to aggregated data.

In the tree-based index structure shown in FIG. 10, layering may be performed based on attributes. The topmost layer is the root node, and may not represent aggregated data. Correspondingly, the node at the layer may not have an attribute. Each layer below the root node may represent an attribute. As shown in FIG. 10, the second layer represents an attribute "country", the third layer represents an attribute "browser", and the fourth layer represents an attribute "language". Correspondingly, when dividing the tree-based index structure shown in FIG. 10, for example, the aggregation node 105 may divide the tree-based index structure into five sub-trees based on the attributes "country" and "browser", as shown in FIG. 10. Each subtree corresponds to one second file, and each second file may include a plurality of pieces of aggregated data (which correspond to an intermediate node, a star node, and a leaf node in a subtree). Certainly, the tree-based index structure may alternatively be divided based on an attribute. This is not limited in this embodiment.

The upper limit of the difference of the attribute values of the attribute means that a maximum difference between attribute values of a preset attribute of different aggregated data in each second file does not exceed the upper limit of the difference. When dividing an aggregated file, the aggregation node 105 may calculate differences between attribute values of the preset attribute of different aggregated data in the aggregated file, so that an attribute value of a piece of aggregated data is used as a reference, aggregated data whose attribute value difference from the attribute value does not exceed the upper limit of the difference may be divided into a same second file. Then, an attribute value of a piece of aggregated data is used as a reference, aggregated data whose attribute value difference from the attribute value does not exceed the upper limit of the difference and that is from the remaining aggregated data that is not divided into the second file is continued to be divided into another second file according to the foregoing similar process. By analogy, until differences of attribute values of the attribute of the remaining aggregated data that is not finally divided into any second file all do not exceed the upper limit of the difference, the last remaining aggregated data may be used as the last second file. In this way, a plurality of different second files may be obtained through division based on the upper limit of the difference of the attribute values, and differences of attribute values of the attribute of aggregated data in each second file do not exceed the upper limit of the difference.

In an actual application, the aggregation node 105 may alternatively divide aggregated data with reference to the foregoing lexicographic order, the upper limit of the quantity of the nodes, and the upper limit of the difference of the attribute values. This is not limited in this embodiment.

In a possible implementation, each second file may further have corresponding metadata. The metadata may be used to describe a data range of the second file, for example, describe an attribute value range of aggregated data in the second file, to manage a plurality of second files. In an actual application, the attribute value range of the second file may be used as an identifier of the second file, or the like. Alternatively, the metadata of the second file may be used to describe attribute information of the second file. For example, when the second file is obtained through division based on an attribute combination, the metadata may be used to describe attributes of aggregated data included in the second file corresponding to the metadata. Alternatively, the metadata of the second file may be used to describe information such as a data amount and a storage location of the second file. Certainly, the metadata of the second file may alternatively be used to describe the foregoing plurality of types of information at the same time, for example, may describe an attribute value range of aggregated data and a data amount at the same time. This is not limited in this embodiment.

It should be noted that, if a data amount of aggregated data included in each second file obtained through division is small, a large quantity of small files may be obtained after the aggregated data is divided and serialized, and each small file is a file generated after serialization of the second file is completed. Usually, for each small file, the data processing system 100 usually generates corresponding metadata for each small file, for example, information used to describe a storage location, a storage size, an attribute, and an attribute value range of the small file. Because the quantity of the small files is large, correspondingly, an amount of the metadata corresponding to the small files is also large. In this case, the large amount of the metadata of the files not only occupies a large quantity of storage resources of the data processing system 100, but also, when querying data, the data processing system 100 needs to traverse a large quantity of metadata to locate a target file, thereby reducing corresponding query efficiency of the data processing system 100.

Therefore, in a further possible implementation, the aggregation node 105 may further generate a second file with reference to a preset quantity threshold. Specifically, when generating the second file, the aggregation node 105 may further determine whether a data amount of aggregated data included in the second file to be currently generated is greater than the preset quantity threshold. In addition, when the data amount is not greater than the preset quantity threshold, the aggregation node 105 may add new aggregated data to the second file from remaining aggregated data. When the data amount is greater than the preset quantity threshold, the aggregation node 105 does not need to add new aggregated data. In this way, based on a plurality of second files generated by the aggregation node 105, a serialization success rate of the aggregated data can be improved, and that data query efficiency of the data processing system 100 is reduced because excessive small files are generated after the aggregated data is serialized can be avoided.

In an actual application, the aggregation node 105 may not only serialize aggregated data, but also serialize aggregated data together with original data. In this case, a second file generated by the aggregation node 105 may not only include aggregated data, but also include corresponding original data for generating the aggregated data.

In an actual application, after the aggregation node 105 completes serialization of aggregated data (or aggregated data and original data), the data processing system 100 may support corresponding data query based on a plurality of serialized second files.

It should be noted that, in the foregoing embodiment, an example in which the first file is a file formed by original data and the second file is a file formed by aggregated data is used for description. In an actual application, both the first file and the second file may be files formed by aggregated data, or both the first file and the second file may be files formed by original data. A specific implementation of the first file and the second file is similar to the method process described in the foregoing embodiment. For details, refer to the foregoing related descriptions. Details are not described herein again.

Figure 11:
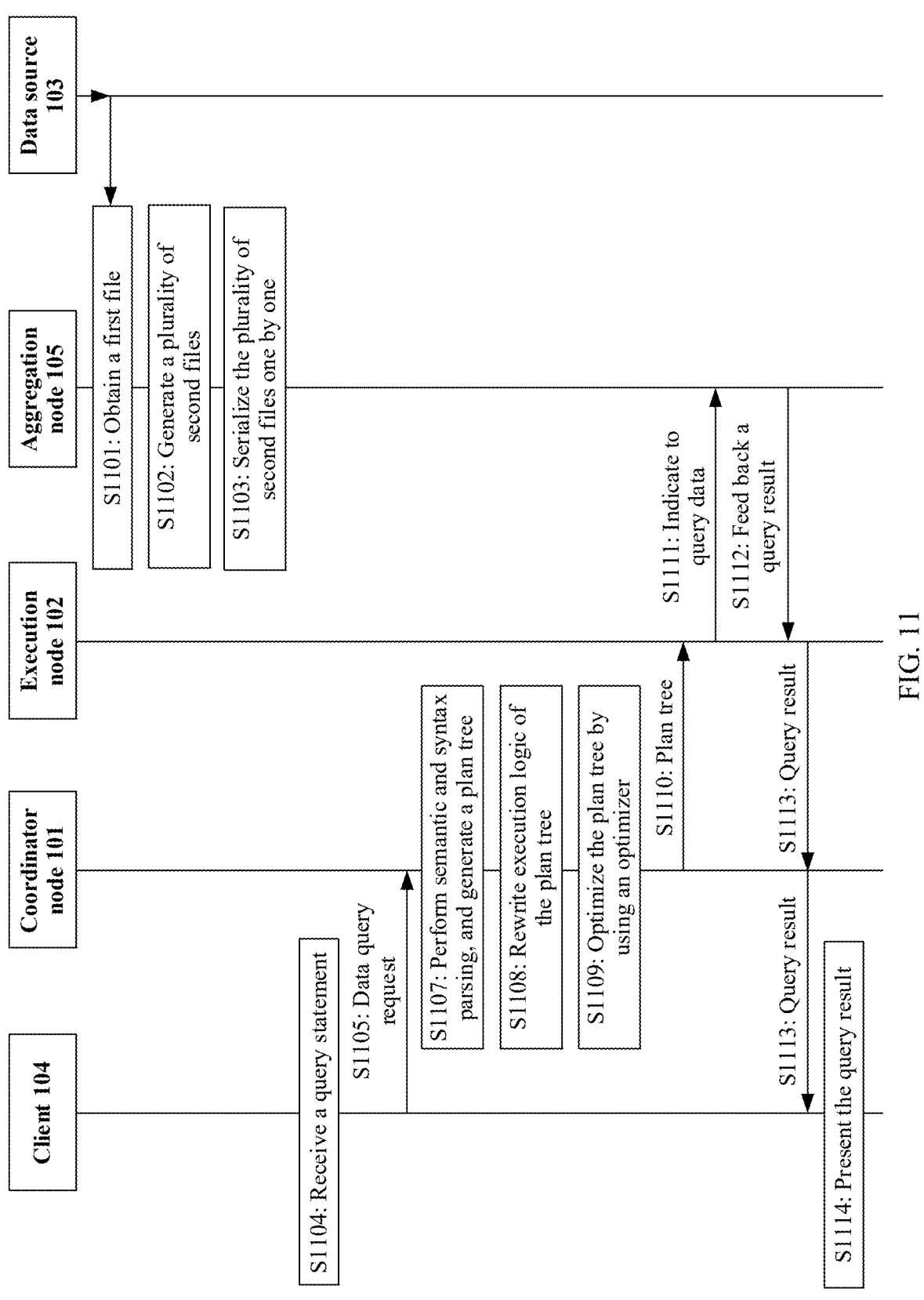
FIG. 11 is a schematic flowchart of generating a second file and supporting data query by using the second file.

For ease of understanding, this application provides an entire procedure of generating a second file and supporting data query by using the second file, as shown in FIG. 11. As shown in FIG. 11, the procedure specifically includes the following steps.

S1101: The aggregation node 105 obtains a first file formed by original data.

S1102: The aggregation node 105 generates a plurality of second files with a smaller data amount based on the first file.

S1103: The aggregation node 105 serializes the plurality of second files one by one.

S1104: The client 104 receives a query statement input by a user. S1105: The client 104 generates a data query request based on the received query statement, and transfers the data query request to the coordinator node 101.

S1106: The coordinator node 101 performs semantic and syntax analysis on the query statement, and generates a plan tree based on the query statement.

S1107: The coordinator node 101 determines a query condition based on the query statement.

S1108: The coordinator node 101 may rewrite execution logic of the plan tree based on the query condition and metadata corresponding to each second file.

In an actual application, the coordinator node 101 may first query whether the second file exists in the data processing system 100. Specifically, the coordinator node 101 may determine whether the second file exists based on the metadata of the second file provided by the aggregation node 105. When the second file exists, the coordinator node 101 may rewrite the execution logic of the plan tree based on the query condition and the metadata of the second file, for example, modify access logic for the original data in the plan tree to access logic for one or more second files.

Specifically, as shown in FIG. 6, the aggregation node 105 may include a generation module (generator) 1051, a query module (selector) 1052, and a metadata module (metadata) 1053. The aggregation node 105 may complete, by using the generation module 1051, generating the plurality of second files based on the original data and serializing the second files. For a specific implementation, refer to the foregoing related descriptions. Details are not described herein again. When each second file is serialized, the metadata module 1053 may record metadata corresponding to each second file, for example, a mapping relationship between each second file and original data.

Correspondingly, when querying data, the coordinator node 101 may obtain the metadata of each second file by using the metadata module 1053 in the aggregation node 105, to determine, based on the query condition and the metadata of each second file provided by the metadata module 1053, a second file or second files from which aggregated data is searched.

For example, based on the original data shown in FIG. 2, a second file A and a second file B may be generated based on an attribute "country". The second file A includes aggregated data corresponding to attribute values "AU" and "CA", and metadata of the second file A may be "country=AU~CA". The second file B includes aggregated data corresponding to attribute values "MX" and "USA", and metadata of the second file B may be "country=MX~USA". When the query condition is to search for aggregated data whose attribute value of the attribute "country" is less than "MX", the coordinator node 101 may separately compare the query condition with the metadata of the second file A and the metadata of the second file B, and determine that the query condition matches the metadata "country=AU~CA", so that the coordinator node 101 may determine to query the data from the second file A, and may change logic for accessing the original data in the plan tree to logic for accessing the second file A.

For another example, when the generated second files are as shown in FIG. 8 the metadata of each second file may be a corresponding attribute combination for generating each second file. It is assumed that the query condition is to search for aggregated data whose attribute value of an attribute "country" is less than "MX" and whose attribute value of an attribute "browser" is less than "Firefox", the coordinator node 101 may match the query condition with the metadata corresponding to each second file shown in FIG. 8, and determine that the query condition matches an attribute combination (country, browser, and click). In this way, the coordinator node 101 may determine to query the data from the second file (that is, the first second file in the first row in FIG. 8) corresponding to the attribute combination, and may change logic for accessing the original data in the plan tree to logic for accessing the second file.

S1109: The coordinator node 101 optimizes the generated plan tree by using one or more optimizers.

S1110: The coordinator node 101 sends an optimized plan tree to the execution node 102.

S1111: The execution node 102 indicates, based on the received plan tree, the query module 1052 in the aggregation node 105 to query data from a corresponding second file.

For example, when data access logic in the plan tree is to access the second file A, the query module 1052 may access the aggregated data in the second file A, and generate a corresponding query result based on the accessed aggregated data.

In this embodiment, the query module 1052 may directly use some or all of the found aggregated data in the second file as a query result.

However, in another possible implementation, the query module 1052 may alternatively perform a secondary aggregation operation on the aggregated data in the accessed second file. For example, when the query module 1052 accesses a plurality of second files, the query module 1052 may perform an aggregation operation on aggregated data in the plurality of second files again, for example, perform a summation operation (that is, the secondary aggregation operation) on aggregate values "click" in two second files, and use a new aggregate result generated by using the secondary aggregation operation as a query result.

In this embodiment, when a data processing capability of the query module 1052 is high, the query module 1052 may generate a query result based on some or all of the found aggregated data in the second file, and return the query result to the execution node 102. In another embodiment, a data processing capability of the query module 1052 is relatively low. In this case, the query module 1052 may feed back the found aggregated data in the second file to the execution node 102, and the execution node 102 performs a corresponding calculation based on the received aggregated data, for example, performs a secondary aggregation operation on the received aggregated data, or further finds aggregated data that meets the query condition from the received aggregated data. This is not limited in this application.

S1112: The aggregation node 105 may feed back the query result to the execution node 102.

It should be noted that for each query task, a data amount of aggregated data accessed by the execution node 102 from the aggregation node 105 is small, and occupies a small quantity of bandwidth resources between the execution node 102 and the aggregation node 105. Therefore, the bandwidth resources between the execution node 102 and the aggregation node 105 may support simultaneous execution of a plurality of query tasks, and support concurrent access of a larger quantity of query tasks. For example, it is assumed that for each query task, a maximum bandwidth required for the execution node 102 to access the aggregated data from the aggregation node 105 does not exceed 1 G (gigabit), and a total bandwidth between the execution node 102 and the aggregation node 105 is 5 G. In this case, the execution node 102 may support data access of at least five query tasks at the same time. Specifically, five threads on the execution node 102 may access the aggregated data from the aggregation node 105 in parallel.

S1113: The execution node 102 returns the query result to the client 104 by using the coordinator node 101.

S1114: The client 104 presents the query result to the user.

It should be noted that, for a specific implementation of each step in this embodiment, refer to the related descriptions in the foregoing embodiments. Details are not described herein again.

The foregoing describes in detail, with reference to FIG. 1 to FIG. 11, the data query method provided in this application. The following describes, with reference to FIG. 12 and FIG. 13, a data query apparatus and a device provided in this application.

Figure 12:
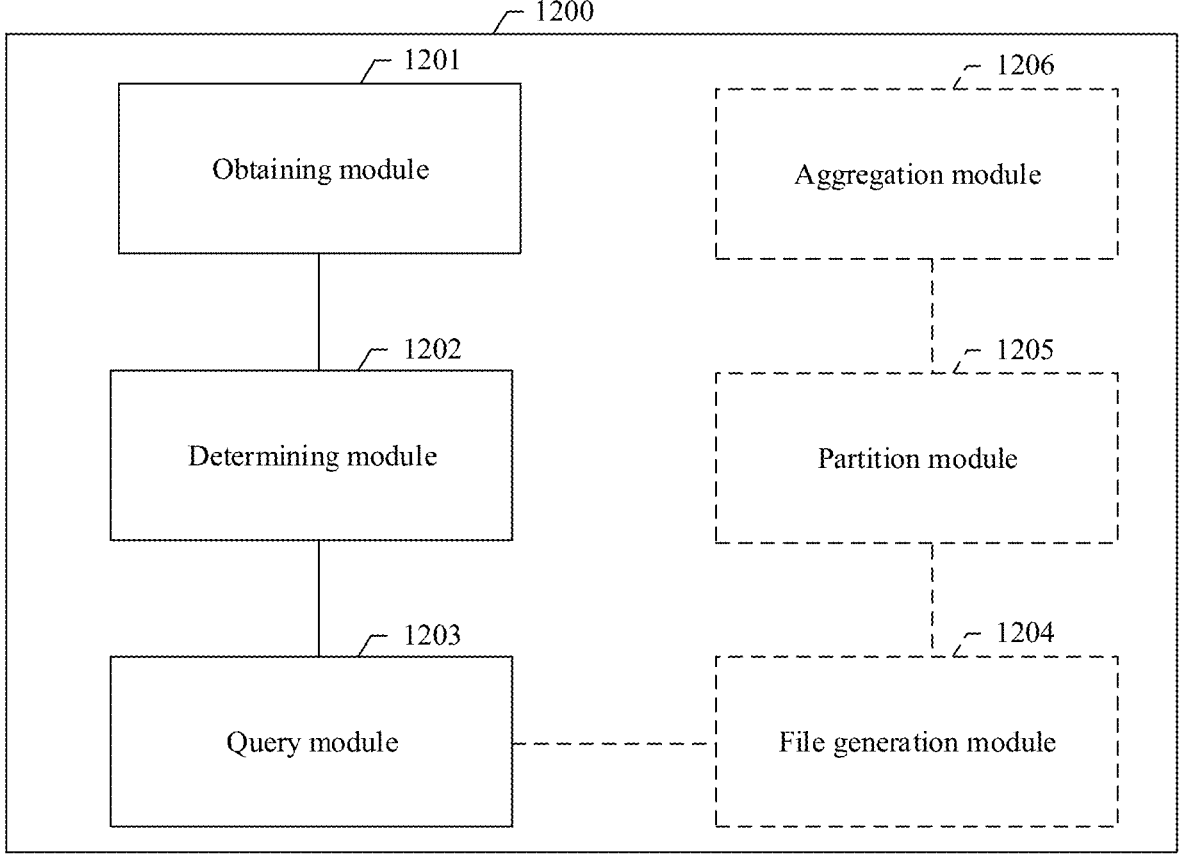
FIG. 12 is a schematic diagram of a structure of a data query apparatus according to an embodiment of this application.

Based on a same inventive concept as the foregoing method, an embodiment of this application further provides the data query apparatus. The data query apparatus may implement a function of the data processing system in the embodiment shown in FIG. 3. As shown in FIG. 12, a data query apparatus 1200 may include:

an obtaining module 1201, configured to receive a data query request, where the data query request is used to query target data from a first file, the first file corresponds to a plurality of second files, the plurality of second files are generated based on the first file, and a data amount of each second file is less than a data amount of the first file;

a determining module 1202, configured to determine, from the plurality of second files, a target file including the target data; and a query module 1203, configured to query the target data from the target file.

In a possible implementation, the first file includes a plurality of attributes, the second file includes at least one of the plurality of attributes, and the determining module 1202 is specifically configured to determine, from the plurality of second files based on a target attribute in the data query request, a second file including the target attribute as the target file.

In a possible implementation, the query module 1203 is specifically configured to replace a first file in a plan tree generated based on the data query request with the target file.

In a possible implementation, the apparatus 1200 further includes:

an aggregation module 1206, configured to perform an aggregation operation on the first file based on a preset attribute in the plurality of attributes of the first file, to obtain an aggregated file;

a partition module 1205, configured to partition the aggregated file based on a value included in the preset attribute, where each partition includes data corresponding to at least one value; and a file generation module 1204, configured to form a second file for each partition.

In a possible implementation, the partition module 1205 is specifically configured to partition, in a memory, the aggregated file based on the value included in the preset attribute; and the file generation module 1204 is specifically configured to: serialize data in a partition to form a second file, persistently store the second file, and serialize data in a next partition.

In a possible implementation, the obtaining module 1201 is further configured to obtain M attributes from N attributes of the first file, and form the second file based on data corresponding to the M attributes, where the plurality of second files include second files with a same value of M and second files with different values of M, and attributes included in the second files with the same value of M are not totally the same.

In a possible implementation, the obtaining module 1201 is specifically configured to:

read the first file into a memory, and obtain the M attributes from the first file;

perform an aggregation operation on the data corresponding to the M attributes;

serialize data obtained after the aggregation operation, to form a second file; and store the second file in a persistent storage area.

The data query apparatus 1200 in this embodiment is corresponding to the data query method shown in FIG. 3. Therefore, for a specific implementation of each function module in the data query apparatus 1200 in this embodiment and technical effects thereof, refer to related descriptions in the embodiment shown in FIG. 3. Details are not described herein again.

Figure 13:
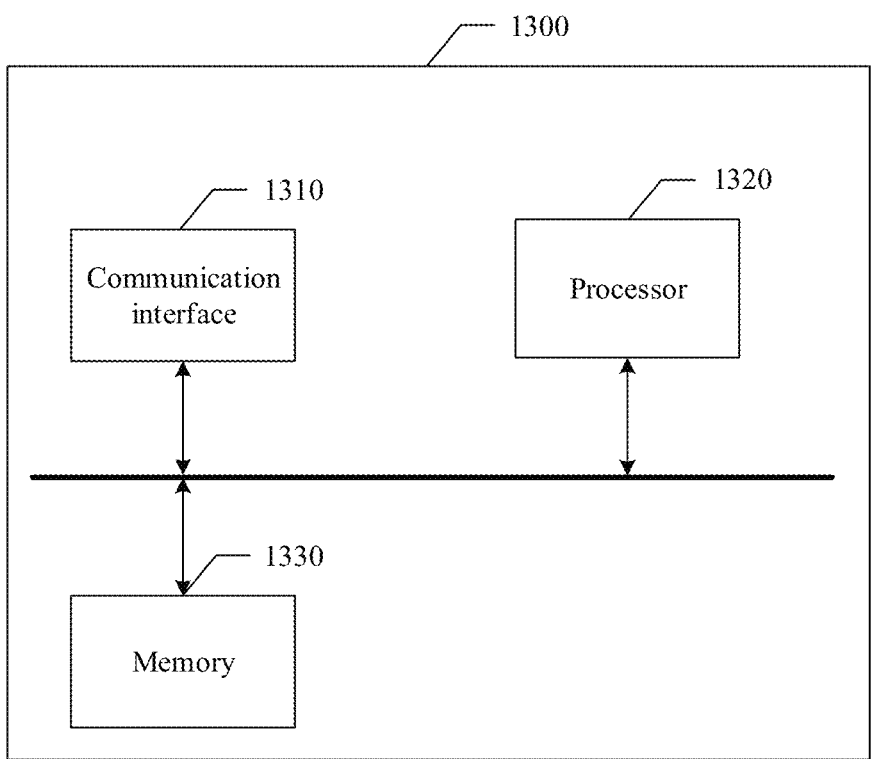
FIG. 13 is a schematic diagram of a hardware structure of a device according to an embodiment of this application.

In addition, an embodiment of this application further provides the device. As shown in FIG. 13, a device 1300 may include a communication interface 1310 and a processor 1320. Optionally, the device 1300 may further include a memory 1330. The memory 1330 may be disposed inside the device 1300, or may be disposed outside the device 1300. For example, all actions in the embodiment shown in FIG. 3 may be implemented by the processor 1320. The processor 1320 may obtain a first file from a data source through the communication interface 1310, and is configured to implement any method performed in FIG. 3. In an implementation process, steps in a processing procedure may be implemented by using an integrated logic circuit of hardware in the processor 1320 or an instruction in a form of software, to implement the method performed in FIG. 3. For brevity, details are not described herein again. Program code used by the processor 1320 to implement the foregoing method may be stored in the memory 1330. The memory 1330 is connected to the processor 1320, for example, is coupled to the processor 1320.

Some features of this embodiment of this application may be implemented/supported by the processor 1320 by executing program instructions or software code in the memory 1330. Software components loaded on the memory 1330 may be summarized in terms of function or logic, for example, the determining module 1202, the query module 1203, the aggregation module 1206, the partition module 1205, and the file generation module 1204 shown in FIG. 12. A function of the obtaining module 1201 may be implemented by the communication interface 1310.

Any communication interface in embodiments of this application may be a circuit, a bus, a transceiver, or another apparatus that may be configured to exchange information, for example, the communication interface 1310 in the device 1300. For example, the another apparatus may be a device connected to the device 1300, for example, may be a host that sends a data read command or a data write command.

In embodiments of this application, the processor may be a general-purpose processor, a digital signal processor, an application-specific integrated circuit, a field-programmable gate array or another programmable logic device, a discrete gate or transistor logic device, or a discrete hardware component, and can implement or perform the methods, steps, and logical block diagrams disclosed in embodiments of this application. The general-purpose processor may be a microprocessor, any conventional processor, or the like. The steps of the method disclosed with reference to embodiments of this application may be directly performed by a hardware processor, or may be performed by using a combination of hardware in the processor and a software module.

The coupling in embodiments of this application is an indirect coupling or a communication connection between apparatuses, units, or modules, may be in an electrical form, a mechanical form, or another form, and is used for information exchange between the apparatuses, the units, and the modules.

The processor may operate with the memory. The memory may be a nonvolatile memory, for example, a hard disk drive (HDD) or a solid-state drive (SSD), or may be a volatile memory, for example, a random access memory (RAM). The memory is any other medium that can carry or store expected program code in a form of an instruction or a data structure and that can be accessed by a computer, but is not limited thereto.

A specific connection medium between the communication interface, the processor, and the memory is not limited in embodiments of this application. For example, the memory, the processor, and the communication interface may be connected through a bus. The bus may be classified into an address bus, a data bus, a control bus, and the like.

Based on the foregoing embodiments, an embodiment of this application further provides a computer storage medium. The storage medium stores a software program, and when read and executed by one or more processors, the software program may implement the method performed by the data processing system 100 provided in any one or more of the foregoing embodiments. The computer storage medium may include: any medium that can store program code, such as a USB flash drive, a removable hard disk, a read-only memory, a random access memory, a magnetic disk, or an optical disc.

Based on the foregoing embodiments, an embodiment of this application further provides a chip. The chip includes a processor, configured to implement functions of the data processing system 100 in the foregoing embodiments, for example, configured to implement the method performed in FIG. 3. Optionally, the chip further includes a memory, and the memory is configured to store program instructions and data that are necessary and executed by the processor. The chip may include a chip, or may include a chip and another discrete device.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more processes in the flowcharts and/or in one or more blocks in the block diagrams.

In the specification, claims, and accompanying drawings of this application, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in embodiments of this application.

It is clear that a person skilled in the art can make various modifications and variations to embodiments of this application without departing from the scope of embodiments of this application. In this case, this application is intended to cover these modifications and variations of embodiments of this application provided that they fall within the scope of protection defined by the following claims and their equivalent technologies.

What is claimed is:

1. A method, wherein the method comprises:
 reading, by an aggregation node in a data processing system, a first file into a memory, wherein the data processing system comprises a coordinator node, an execution node, and the aggregation node, the first file comprises pieces of original data, and each original data is associated with a plurality of attributes;
 performing, by the aggregation node, an aggregation operation on the first file based on at least one attribute of the plurality of attributes to obtain an aggregated file, wherein the performing comprises calculating an aggregate value for at least two pieces of original data having a same attribute value for the at least one attribute;
 generating, by the aggregation node, a plurality of second files based on the aggregated file, wherein a data amount of each second file is less than a data amount of the first file;
 serializing, by the aggregation node, the plurality of second files one by one;
 receiving, by the coordinator node, a data query request, wherein the data query request queries target data from the first file, and the first file corresponds to the plurality of second files;
 determining, by the coordinator node from the plurality of second files, a target file comprising the target data; and
 querying, by the execution node, the target data from the target file.

2. The method according to claim 1, wherein the first file comprises the plurality of attributes, one of the plurality of second files comprises at least one of the plurality of attributes, and the determining, by the coordinator node from the plurality of second files, a target file comprising the target data comprises:
 determining, by the coordinator node from the plurality of second files based on a target attribute in the data query request, a second file comprising the target attribute as the target file.

3. The method according to claim 1, wherein the querying, by the execution node, the target data from the target file comprises:
 replacing, by the execution node, the first file in a plan tree generated based on the data query request with the target file.

4. The method according to claim 1, wherein the at least one attribute comprises a preset attribute, and wherein the method further comprises:
 partitioning the aggregated file based on a value comprised in the preset attribute, wherein each partition comprises data corresponding to at least one value; and
 forming a second file for each partition.

5. The method according to claim 4, wherein the partitioning the aggregated file based on a value comprised in the preset attribute comprises:

partitioning, in the memory, the aggregated file based on the value comprised in the preset attribute; and the forming a second file for each partition comprises:

serializing data in a partition to form the second file, persistently storing the second file, and serializing data in a next partition.

6. The method according to claim 1, wherein the method further comprises:

obtaining M attributes from N attributes of the first file, and forming the plurality of second files based on data corresponding to the M attributes, wherein the plurality of second files comprise second files with a same value of M and second files with different values of M, and attributes comprised in the second files with the same value of M are not totally the same.

7. The method according to claim 6, wherein the obtaining M attributes from N attributes of the first file, and forming the plurality of second files based on data corresponding to the M attributes comprises:

obtaining the M attributes from the first file;

performing the aggregation operation on the data corresponding to the M attributes to obtain aggregated data;

serializing the aggregated data obtained after the aggregation operation to form a second file; and storing the second file in a persistent storage area.

8. A device, comprising:

at least one processor; and one or more memories coupled to the at least one processor and storing programming instructions for execution by the at least one processor to:

read a first file into a memory, the first file comprising pieces of original data, wherein each original data is associated with a plurality of attributes;

perform an aggregation operation on the first file based on at least one attribute of the plurality of attributes to obtain an aggregated file, wherein the aggregation operation is performed by operations comprising calculating an aggregate value for at least two pieces of original data having a same attribute value for the at least one attribute;

generate a plurality of second files based on the aggregated file, wherein a data amount of each second file is less than a data amount of the first file;

serialize the plurality of second files one by one;

receive a data query request, wherein the data query request queries target data from the first file, and the first file corresponds to the plurality of second files;

determine, from the plurality of second files, a target file comprising the target data; and query the target data from the target file.

9. The device according to claim 8, wherein the first file comprises the plurality of attributes, one of the plurality of second files comprises at least one of the plurality of attributes, and the programming instructions are for execution by the at least one processor to:

determine, from the plurality of second files based on a target attribute in the data query request, a second file comprising the target attribute as the target file.

10. The device according to claim 8, wherein the programming instructions are for execution by the at least one processor to:

replace the first file in a plan tree generated based on the data query request with the target file.

11. The device according to claim 8, wherein the at least one attribute comprises a preset attribute, and wherein the programming instructions are for execution by the at least one processor to:

partition the aggregated file based on a value comprised in the preset attribute, wherein each partition comprises data corresponding to at least one value; and form a second file for each partition.

12. The device according to claim 11, wherein the programming instructions are for execution by the at least one processor to:

partition, in the memory, the aggregated file based on the value comprised in the preset attribute; and serialize data in a partition to form a second file, persistently storing the second file, and serializing data in a next partition.

13. The device according to claim 8, wherein the programming instructions are for execution by the at least one processor to:

obtain M attributes from N attributes of the first file, and form the plurality of second files based on data corresponding to the M attributes, wherein the plurality of second files comprise second files with a same value of M and second files with different values of M, and attributes comprised in the second files with the same value of M are not totally the same.

14. The device according to claim 13, wherein the programming instructions are for execution by the at least one processor to:

obtain the M attributes from the first file;

perform the aggregation operation on the data corresponding to the M attributes;

serialize data obtained after the aggregation operation to form a second file; and store the second file in a persistent storage area.

15. A non-transitory computer storage medium, wherein the non-transitory computer storage medium stores programming instructions for execution by at least one processor of an apparatus to cause the apparatus to perform operations comprising:

reading a first file into a memory, the first file comprising pieces of original data, wherein each original data is associated with a plurality of attributes;

performing an aggregation operation on the first file based on at least one attribute of the plurality of attributes to obtain an aggregated file, wherein the performing comprises calculating an aggregate value for at least two pieces of original data having a same attribute value for the at least one attribute;

generating a plurality of second files based on the aggregated file, wherein a data amount of each second file is less than a data amount of the first file;

serializing the plurality of second files one by one;

receiving a data query request, wherein the data query request queries target data from the first file, and the first file corresponds to the plurality of second files;

determining, from the plurality of second files, a target file comprising the target data; and querying the target data from the target file.

16. The non-transitory computer storage medium according to claim 15, wherein the first file comprises the plurality of attributes, one of the plurality of second files comprises at least one of the plurality of attributes, and the determining, from the plurality of second files, a target file comprising the target data comprises:

determining, from the plurality of second files based on a target attribute in the data query request, a second file comprising the target attribute as the target file.

17. The non-transitory computer storage medium according to claim 15, wherein the querying the target data from the target file comprises:

replacing the first file in a plan tree generated based on the data query request with the target file.

18. The non-transitory computer storage medium according to claim 15, wherein the at least one attribute comprises a preset attribute, and wherein the operations further comprise:

partitioning the aggregated file based on a value comprised in the preset attribute, wherein each partition comprises data corresponding to at least one value; and forming a second file for each partition.

19. The non-transitory computer storage medium according to claim 15, wherein the operations further comprise:

obtaining M attributes from N attributes of the first file, and forming the plurality of second files based on data corresponding to the M attributes, wherein the plurality of second files comprise second files with a same value of M and second files with different values of M, and attributes comprised in the second files with the same value of M are not totally the same.

20. The non-transitory computer storage medium according to claim 19, wherein the obtaining M attributes from N attributes of the first file, and forming the plurality of second files based on data corresponding to the M attributes comprises:

obtaining the M attributes from the first file;

performing the aggregation operation on the data corresponding to the M attributes to obtain aggregated data;

serializing the aggregated data obtained after the aggregation operation to form a second file; and storing the second file in a persistent storage area.

* * * * *